United States Patent [19]

Tokayer

[11] 4,382,403
[45] May 10, 1983

[54] INDUSTRIAL COOKING MACHINES

[75] Inventor: Josef Tokayer, Willowdale, Canada

[73] Assignee: Orbit BBQ Products Ltd., Richmond Hill, Canada

[21] Appl. No.: 239,667

[22] Filed: Mar. 2, 1981

[51] Int. Cl.³ .......................................... A47J 37/04
[52] U.S. Cl. ........................................ 99/339; 99/340; 99/347; 99/427; 99/443 C; 99/446; 198/473
[58] Field of Search ............... 126/41 C; 99/340, 342, 99/446, 443 C, 386, 389, 390, 391, 393, 400, 427, 347, 339, 401, 352, 355, 402; 198/473

[56] References Cited

U.S. PATENT DOCUMENTS

| | | | |
|---|---|---|---|
| 1,771,762 | 7/1930 | Allwine | 99/386 |
| 2,138,813 | 12/1938 | Bemis | 99/386 X |
| 2,470,446 | 5/1949 | Rankin | 99/443 C |
| 2,928,524 | 3/1960 | Jensen | 99/443 C |
| 3,494,278 | 2/1970 | Chaudoir | 99/427 |
| 3,525,300 | 8/1970 | Genetti | 99/427 |
| 3,664,257 | 5/1972 | Meyer | 99/446 X |
| 3,974,759 | 8/1976 | Rekesius | 99/386 |
| 4,015,517 | 4/1977 | Pomara | 99/443 C |
| 4,156,383 | 5/1979 | Maddox | 99/347 |
| 4,289,064 | 9/1981 | Rosenblatt | 99/386 |

Primary Examiner—Billy J. Wilhite

[57] ABSTRACT

The present invention provides an industrial cooking machine having an endless conveyor passing through both a preheat region and a cooking region with a pair of accesses to the conveyor. These accesses separate the preheat from the cooking region and enable loading and unloading of food onto the conveyor between the two regions. The conveyor is reversible in direction of travel so that the food loaded at the first access can be moved in either one of two directions. Firstly it is movable through the preheat region past the second access to the cooking region and back to the first access and secondly when the conveyor is reversed the food which is loaded on the conveyor at the first access is movable directly through the cooking region to the second access which is positioned to permit unloading of the food without passing through the preheat region.

16 Claims, 7 Drawing Figures

INDUSTRIAL COOKING MACHINES

FIELD OF THE INVENTION

The present invention relates to an industrial cooking machine provided with an endless conveyor and having both a preheat region and a cooking region. The conveyor is reversable so that when preheating is not required the food loaded on the conveyor can be moved directly to the cooking region.

BACKGROUND OF THE INVENTION

Most restaurants and food outlets require a cooking machine having substantial capacity to meet customer demands. These cooking machines must not only be able to accommodate large amounts of food but in addition should be capable of reaching cooking temperatures within a very short period of time for maximizing customer satisfaction. Most presently available industrial cooking machines require substantial time to reach the high temperatures required to cook many foods. In addition the same presently available machines generally require a non-use period when switching from one type of food to another to allow for either further heating of the machine or cooling of the machine for a new cooking temperature required with the change of food in the machine.

Some foods are kept frozen prior to cooking while others are simply refrigerated. Those that are frozen should be preheated by warming them prior to actual cooking of the food. Those that are refrigerated need not be preheated and can be cooked immediately upon removal from refrigeration. Therefore there is a need for a machine capable of cooking either frozen or non-frozen foods.

SUMMARY OF THE INVENTION

The present invention provides an industrial cooking machine designed with the intention of meeting present day industrial cooking demands. The machine comprises a housing having a cooking region as well as a preheat region in the housing, an endless conveyor passing through both of the regions and a pair of accesses to the conveyor separating the preheat region from the cooking region and enabling loading and unloading of food onto the conveyor between the regions. The conveyor is reversable in direction of travel such that when it is moved in one direction, food loaded thereon at either one of the accesses is movable through the preheat region past the other access to the cooking region back to the access at which the food was loaded. However when the conveyor is reversed the food loaded at the loading access is movable directly through the cooking region to the other access which is located with respect to the two regions to permit unloading of the food without passing through the preheat region. Accordingly the machine is capable of the preheating and cooking of frozen foods as well as the cooking of non-frozen foods without preheating.

The cooking region is preferably heated by means of radiant heaters which reach high cooking temperatures almost immediately. In addition the speed of the conveyor may be adjustable so that the degree of cooking for different types of foods at constant temperature can be varied by adjusting the speed of the conveyor.

BRIEF DISCUSSION OF THE DRAWINGS

The above as well as other advantages of features of the present invention will be described in greater detail according to the preferred embodiments of the present invention wherein.

Figure 1:
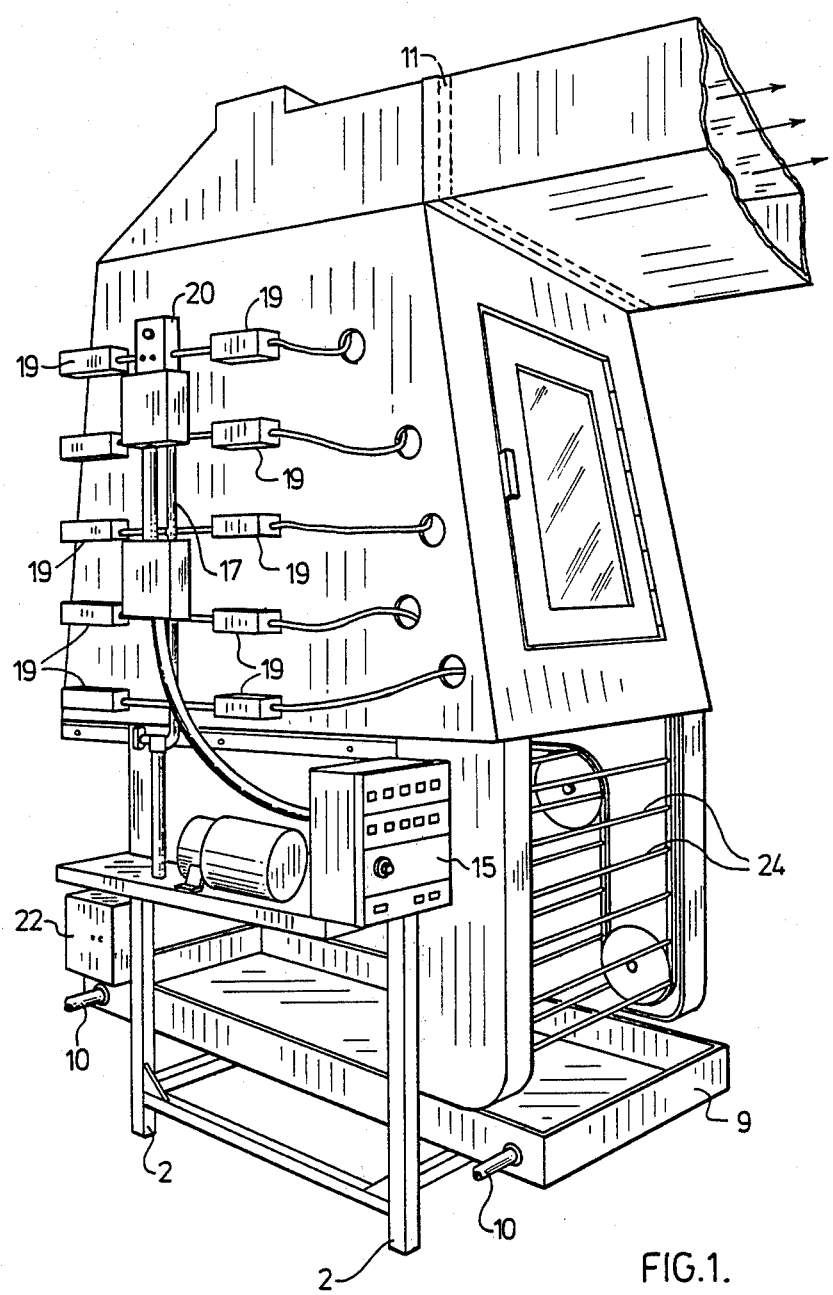
FIG. 1 is a side perspective view of one form of a cooking machine according to an embodiment of the present invention.
Figure 2:
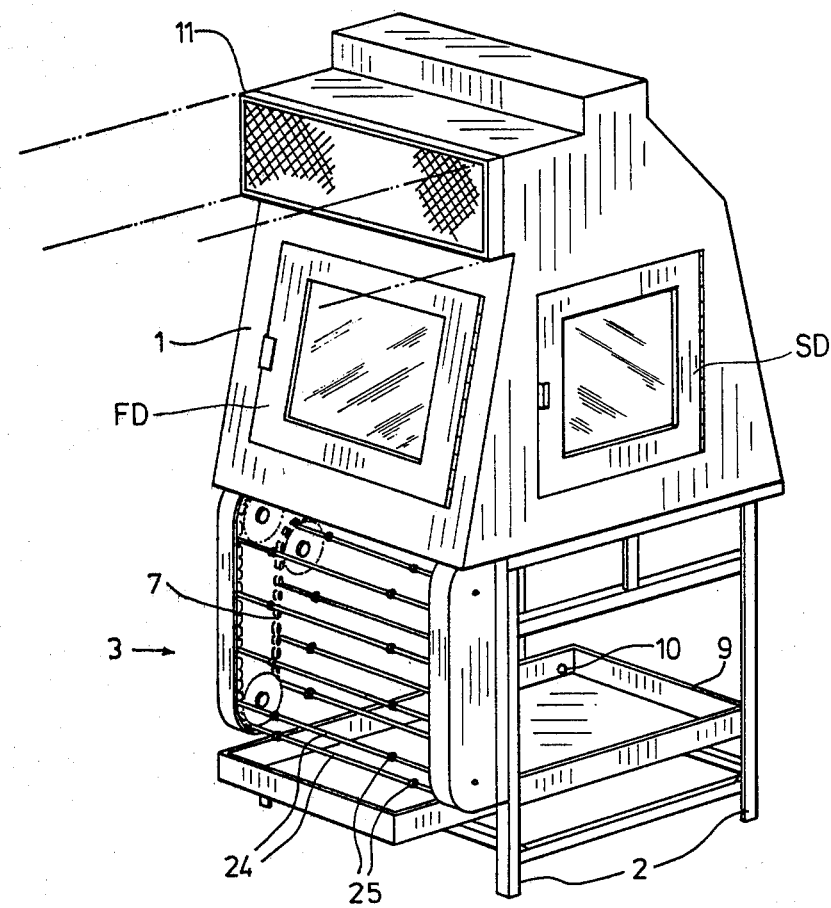
FIG. 2 is a perspective view looking down on the machine from the opposite side from that shown in FIG. 1.
Figure 7:
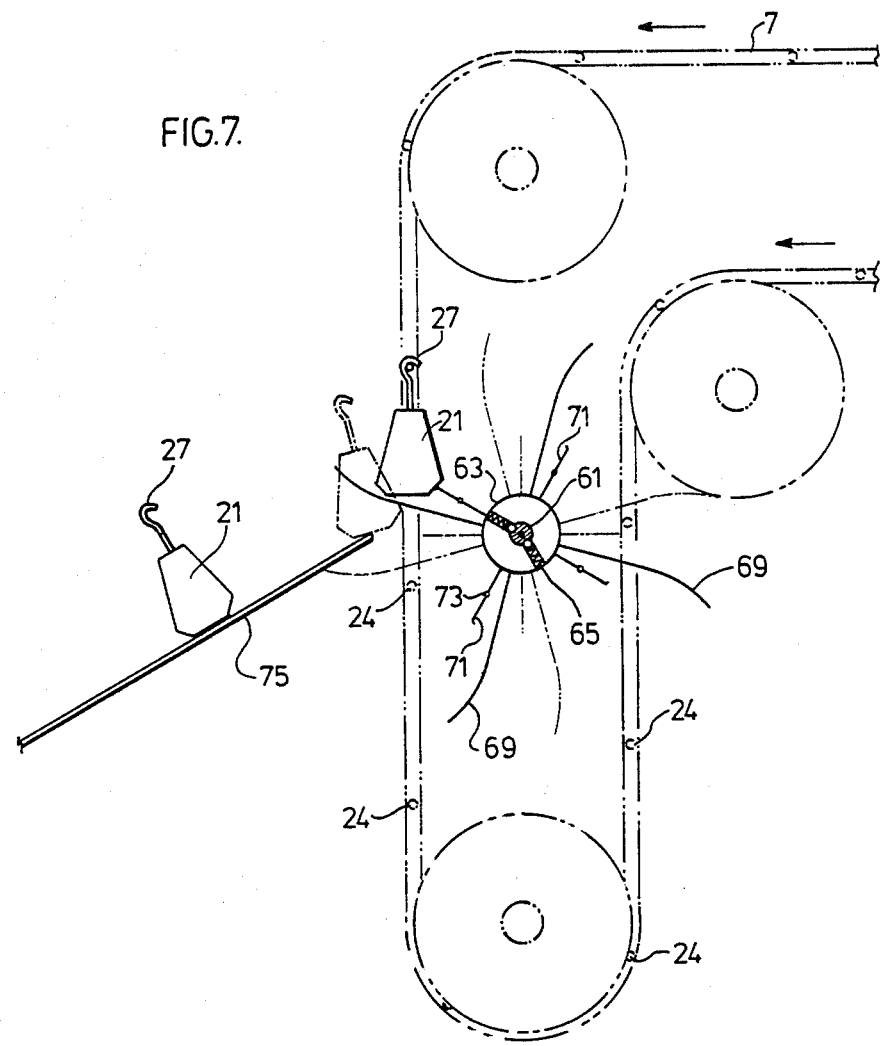

And FIG. 7 is a perspective view looking down on an automatic unloading system also for use at the forward access of the machine shown in FIGS. 1 and 2.

DETAILED DESCRIPTION ACCORDING TO THE PREFERRED EMBODIMENTS

Figure 4:
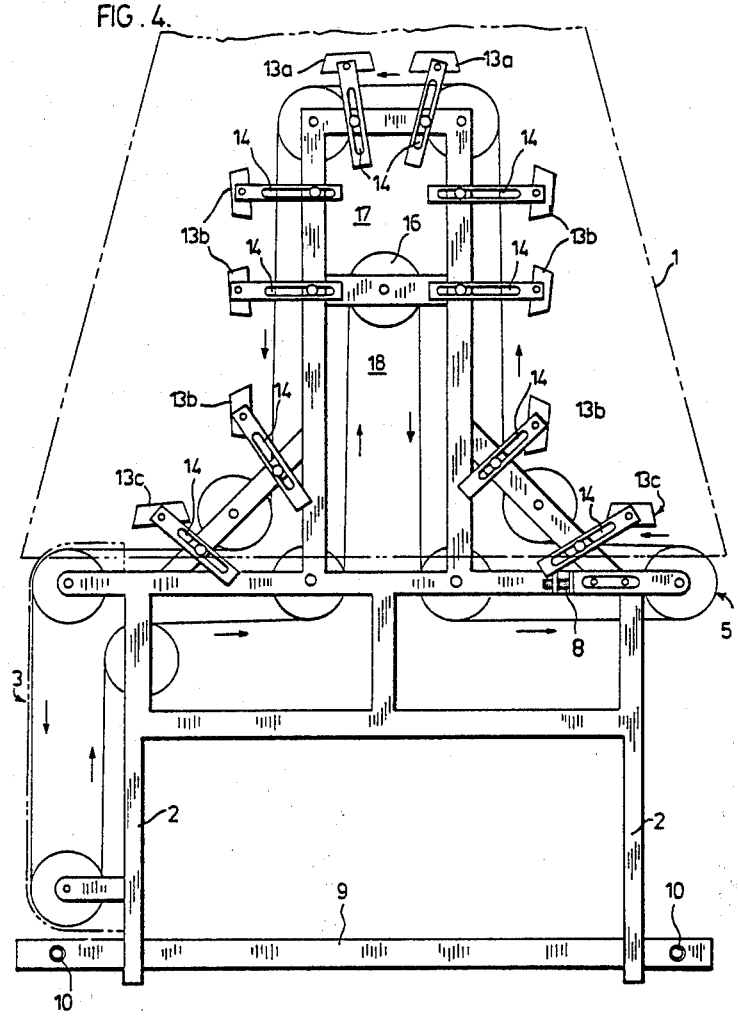
FIG. 4 is a side view of the interior of the machine shown in FIGS. 1 and 2 with the machine housing shown in dotted lines.

The cooking machine shown in FIGS. 1 and 2 comprises a housing 1 provided with an interior conveyor arrangement generally indicated at 7, which runs through a preheat region 18 and a cooking region 17 as is well shown in FIG. 4. The machine is supported by a plurality of legs 2 extending downwardly from the housing. The conveyor is exposed beneath the housing at either end of the machine to provide a forward access 3 and a rearward access 5 to the conveyor as shown in FIG. 4.

The unit further includes a drip pan 9 supported by the legs beneath the conveyor and of sufficient length to catch drippings from the food regardless of where it may be positioned on the conveyor. Drip pan 9 is provided with vents 10 for flushing of the drip pan through the vents. Located above the conveyor is a chimney opening forwardly to a filter and grease trap 11. The chimney is used for the venting of gases and smoke from the housing and the filter and grease trap catch the grease carried by the smoke. The filter is removable for cleaning or replacement.

In addition the housing is provided with a front door FD and a side door SD, which can be seen in the drawings as well as a rear door which cannot be seen in the drawings. Each of these doors includes a window for viewing the interior of the housing. The positioning of the doors enables easy repairs to any of the interior components as well as easy cleaning of the housing. All of the doors are made to be easily opened which acts as a safety precaution in the event of explosions within the housing.

The unit is heated by means of a plurality of radiant heaters 13a, 13b and 13c strategically located within the housing. All of these heaters as well as the conveyor are controlled at an exterior control box 15 shown in FIG. 1. According to this preferred embodiment the heaters are gas operated with the gas being fed to each of the heaters through feed system 17 at the side of the housing. This system includes a manual as well as an automatic sparker for the individual burners as well as a plurality of valves 19 for each burner. Therefore the amount of gas flowing to each burner is easily adjusted according to the level of heat desired.

The arrangement of the heaters with respect to the conveyor is best shown in FIG. 4. At the front end of the machine to the left of the Figure at forward access 3 the conveyor initially travels downwardly and then returns upwardly passing around a series of pullies. From here the conveyor, travelling horizontally well below burner 13c, approaches the center of the unit where it climbs and drops vertically around roller 16. From there the conveyor travels to the rear access 5 where it is again spaced well below the rearward burner 13c. During this portion of the travel from the time the conveyor leaves the forward access until it reaches the rearward access there is very limited exposure of the conveyor to the direct radiation of the heaters thereby providing a preheat region 18 where the conveyor is located a substantial distance from the heaters. However above and to the sides of the preheat region 18 there is a cooking region 17 where the conveyor is in close proximity to the heaters. The cooking region begins as the conveyor leaves the rearward access and travels immediately below rearward burner 13c, then upwardly past back burners 13b and finally beneath top burners 13a before the conveyor again starts downwardly past the forward burners 13b to the forward burner 13c in advance of the forward access. It will be noted in FIG. 5 that the conveyor climbs and drops essentially vertically through the cooking region and is at all times in a position such that food carried on the conveyor cannot drip onto any of the heaters thereby substantially reducing the cleaning required to the heaters as well as reducing smoking from the unit.

The radiant heaters provide an extremely effective method of cooking without substantially raising the temperature of the unit outside of the cooking region. As a result the exterior of the housing as well as the areas around the cooking region remain at a relatively low temperature while the cooking region itself reaches extremely high cooking temperatures. Furthermore with the use of gas these heaters reach and are maintained at that high cooking temperature in an extremely short period.

Conveyor 7 which is controlled from box 15 is adjustable in both speed and direction of travel. Therefore the degree to which food is cooked by the machine may be varied by the speed at which the food is passed through the cooking region rather than by varying the temperature of heaters 13. Accordingly it is possible to cook one kind of food having certain cooking characteristics and immediately thereafter cook a second kind of food of a different cooking characteristic without waiting for the oven to either increase or decrease in temperature.

Figure 5:
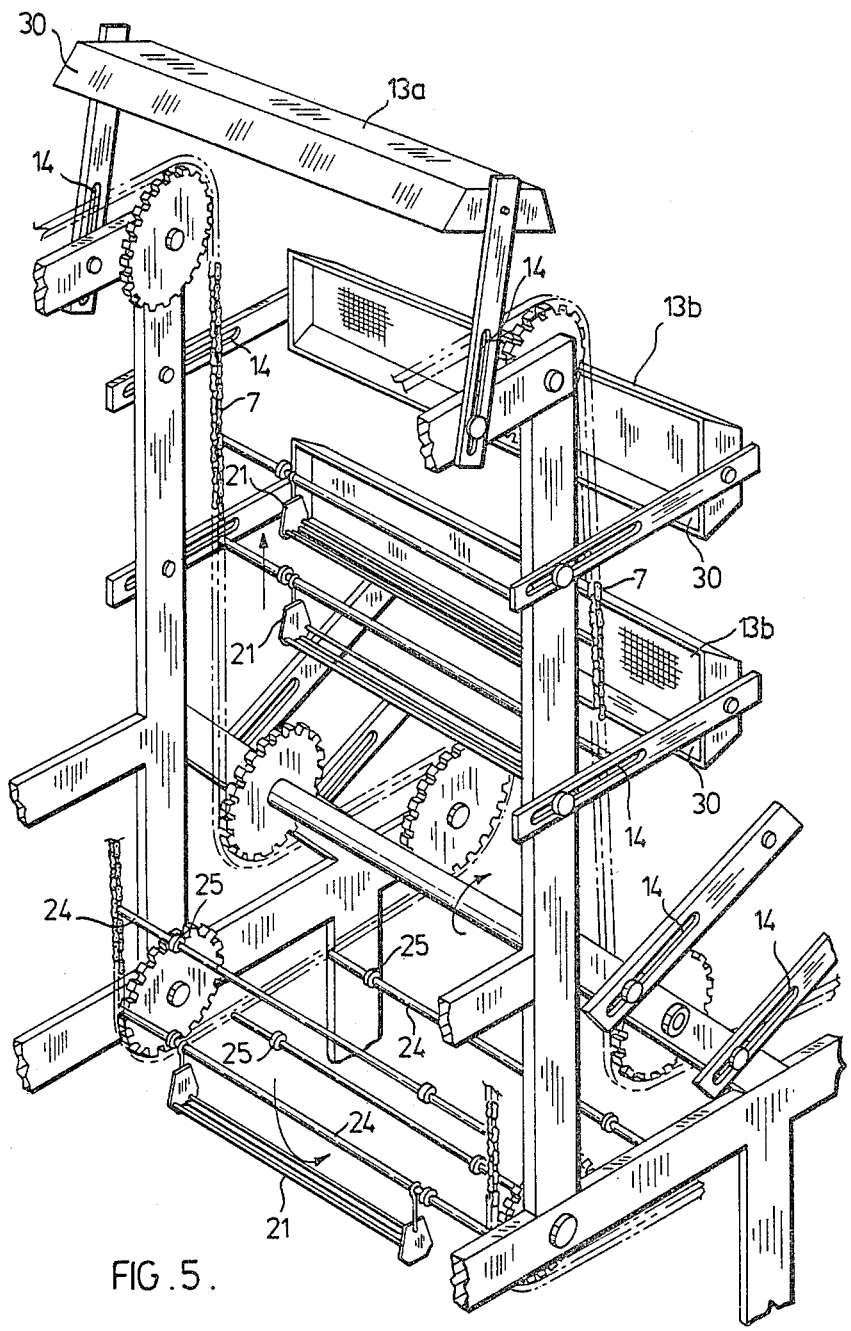
FIG. 5 is a perspective view showing a section of the heating system used in the machine of FIGS. 1 and 2.

The conveyor which is shown in section in FIG. 5 comprises a pair of endless chains wrapped around the pully arrangement of FIG. 4. Provided on these chains are a plurality of horizontal bars 24. Each one of these bars is secured internally of the chains to the conveyor so that they do not interfere with the pullies enabling continuous revolutions of the conveyor through the unit. An adjustment mechanism 8 is provided at the rear pullies of the conveyor to permit tightening or loosening of the chains on the conveyor.

In addition each of the heaters 13 is secured to the housing through a nut and slotted bar arrangement 14 so that the heaters are adjustable towards and away from the conveyor where the food is carried past the heaters.

Figure 3:
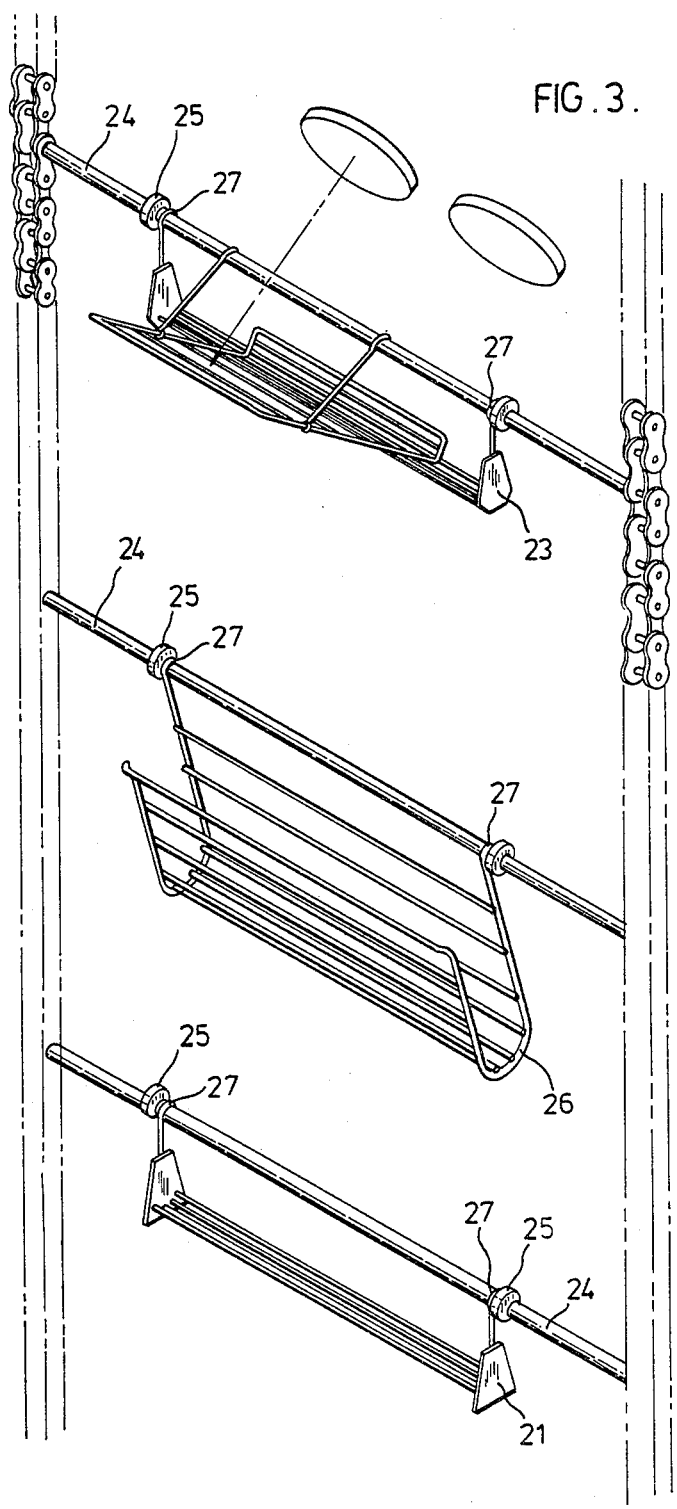
FIG. 3 is a perspective view of a section of the food conveyor carrying different forms of food baskets used to carry food in the cooking machine of FIGS. 1 and 2.

A number of different preferred food carriers are shown in FIG. 3. Each of these food carriers has a different shape adapted for the particular type of food to be carried. For example, in FIG. 3 food carrier 21 which has a concave supporting surface is shaped to carry small meatballs and the like which due to the shaping of the food carrier are not likely to fall from the conveyor as it moves through the cooking machine. Food carrier 23 on the other hand is shaped for carrying flatter type foods such as small pizzas and the like, while food carrier 25 can carry either of the above types of foods. These carriers can also be combined with one another for increasing both the size and the versatility of the carriers.

Although each of these carriers has a somewhat different shape it will be noted that all of them are provided with open ended hooks 27 adapted for hanging over the carrying bars 24 of the conveyor. According to this arrangement all of the food baskets or carriers are self levelling so that they hang vertically on the conveyor regardless of their position in the cooking machine.

The operation of the cooking machine as described thus far is as follows. The food is loaded onto the conveyor at either of the accesses although forward access 3 is preferably used because of its increased conveyor exposure. If the food requires preheating in advance of cooking the conveyor is adjusted to move in the anticlockwise direction whereby the food baskets are carried by the conveyor from the forward access to the preheat region 18. This preheat region receives a certain amount of heat from heaters 13 but is spaced sufficiently far from the direct radiation of the heaters so that it does not reach cooking temperatures.

From the preheat region the food then travels to the rear access 5. For some foods such as bacon and bread the preheat is all that is required and the food is unloaded at the rear access. However where cooking is required the food remains on the conveyor which continues past the rear access upwardly into the cooking region 17. In the cooking region the food baskets travel essentially vertically, one above another in close proximity to the radiant heaters. The heat generated in the cooking region will in many foods such as hamburgers, steaks, etc. cause the meat juices to exude from the food and due to vertical alignment of adjacent food baskets the drippings from the higher baskets fall onto the food of the lower baskets providing for self-basting of the food while in the cooking region. In addition heaters 13 are set up to radiate heat around substantially all of the food product being carried in the food baskets to ensure complete cooking.

As mentioned above the food can either be carried quickly through the cooking region to limit the amount of cooking or it can be carried through more slowly to increase the degree of cooking. This of course is up to the choice of the individual who is cooking the food. However an alternative method of controlling the degree of cooking is to vary the burner intensity by either lowering the gas fed to the burners or by actually turning some of the burners off. This is made possible by the provision of individual burner controls at box 15 allowing independent control of each of the burners.

After the food completes its travel through the cooking region it is then returned to the forward access where it can be unloaded either manually or automatically as will be described later in detail.

In some instances the food may not be completely cooked in the first pass through the cooking region however the food will generally not require further preheat and accordingly it is desirable to avoid the preheat region for further cooking of the food. In addition some foods may not require preheat whatsoever. Both of these situations are easily taken into account by simply reversing direction of travel of the conveyor in which case the food moves in the clockwise direction from the forward access directly to the cooking region avoiding the preheat area. The food after having passed through the cooking region then moves to the rear access between the cooking and preheat regions where the food can be unloaded from the conveyor.

It should be noted that if one wishes to work from the back of the machine the same requirements for cooking of the food can easily be met, i.e. the food can be moved from the rear access through the preheat past the forward access into the cooking region and back to the rear access or it can be moved directly from the rear access to the cooking region to the forward access for unloading without any preheating whatsoever.

In the event that the conveyor should fail the cooking machine is provided with an automatic shut down for turning off the heaters 13 so that any food which remains in the cooking region is not burned as it otherwise would be if the heaters remained active with the food stationary. This automatic shut down has a slight delay to eliminate inadvertant on/off switching of the heaters caused by slight delays and pauses in the conveyor. In addition the machine is provided with a thermostat 20 shown in FIG. 1 near the upper end of the machine. This thermostat is set to turn the burners off in the event of excessive heat build up in the cooking region to prevent overcooking of the food or damage to the machine.

If the machine does shut down automatically the operator must determine where the problem lies in order to rectify the situation. For this purpose both the conveyor drive box 22 and the thermostat 20 are provided with a set of condition indicating lights which register either normal or shut down condition at that particular station. By reading these lights the operator can easily determine whether the problem is in the cooking region or at the conveyor or at both stations and adjust the machine accordingly.

Figure 6:
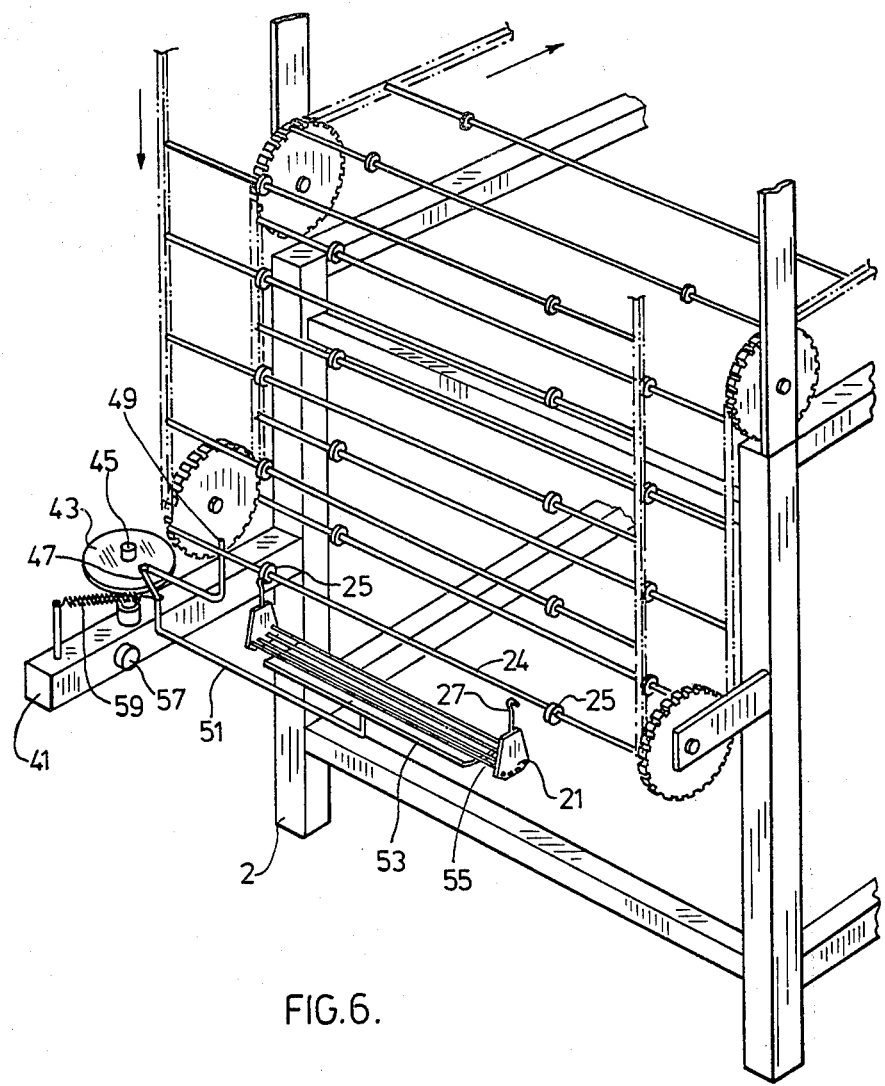
FIG. 6 is a side view of an automatic loading system for use on the cooking machine at its forward access.

The loading system shown in FIG. 6 is one which is adapted for automatic loading of food baskets 21 shown in FIG. 3 onto the conveyor at the forward access. The loading arrangement comprises a supporting member 41 secured to one of the supporting legs of the machine near the bottom end of the forward access. Provided on supporting bar 41 is a small upright shaft 45 with a limited rotation wheel 43 fitted over the shaft. Feed bar 47 secured to the wheel is provided with a forward vertically projecting tongue 49 as well as a tray bearing rod 51 carrying tray 53. Tray 53 is in turn provided with a pair of locaters 55 at either end of the tray for locating food carrier 21 in position on the loading device. Locaters 55 act as a guide to ensure that the hooks 27 of carrier 21 fit between the stop members 25 of the conveyor bar 24 as the carrier is automatically loaded onto the conveyor.

The system additionally includes a return spring 59 normally biasing the device away from the loading position as well as a bumper 57 on the inner side of support bar 41.

The operation of the loading system is controlled by the movement of the conveyor as it travels in the anticlockwise direction. Tongue 49 of bar assembly 47 is positioned such that it extends into the path of the conveyor however the depth of the vertical tongue is such that it does not impede the progress of the conveyor bars. As each one of the bars rides downwardly over the vertical tongue and around the lower most pullies on the conveyor system, bar assembly 47 is pulled inwardly toward the conveyor by virtue of the contact between vertical tongue 49 and the conveyor bar. As assembly 47 is pulled inwardly wheel 43 is rotated forwardly against the pressure of spring 59. This carries the supporting rod 51 as well as tray 53 carrying the food basket 21 forwardly toward the conveyor bar. The timing of the pulling action is such that hooks 27 of basket 21 are eased over the conveyor bar at its lower most position on the pullies. As the conveyor bar then begins it upward travel, hooks 27 are locked into position and the food basket is carried upwardly with the conveyor. At the same time the conveyor bar rises to the extent that it clears beyond the upper end of vertical tongue 49 at which time spring 59 pulls the entire bar assembly rearwardly back to the initial position for loading of a second basket onto the conveyor, either by hand or by an automatic ramping means feeding the loading device. Bumper 57 absorbs much of the impact as the bar assembly is pulled back into the loading position.

The unloading arrangement shown in FIG. 7 is also adapted for the use at the forward access of the machine and can be used simutaneously with the loading arrangement described above.

The unloading system includes a fixed shaft 61 extending completely across the front of the housing. Sleeve 63 provided with a spring loaded ball 65 is fitted over shaft 61 which is notched to receive the ball at predetermined fixed intervals, therefore the sleeve is adapted to rotate about the shaft when subjected to a force great enough to overcome the spring ball and to lock into predetermined positions with respect to the shaft.

Sleeve 63 is provided with a plurality of outwardly extending arms 69 which are adapted to grab bars 24 of conveyor 7 to the outsides of locaters 25. The sleeve is additionally provided with a plurality of interference members 71 off-set from and located interiorly of arms 69. The unloading system further includes a take-away ramp 75 for carrying the food baskets away from the machine after they have been automatically unloaded.

The unloading system is set up such that interference members 71 when set in an interference position, i.e. the position shown in FIG. 7 engage the bottom sides of the food baskets as they come into contact with the interference members. The interference member then lifts the food basket to the extent that hooks 27 are released from the conveyor bar and the food basket is carried away down ramp 75. The weight of the food basket is not adequate to rotate sleeve 63 about shaft 61.

Each of the interference members terminates slightly short of the conveyor so that the conveyor bars are permitted to pass by the interference members without contact. However the conveyor bars which are moving downwardly on one side of the bottom pullies and upwardly on the other side of the pullies come into contact with arms 69 at either side of the conveyor to rotate sleeve 63 about shaft 61 to bring a new interference member into the unloading position. As will be understood from the above, the force of the conveyor is more than adequate to overcome the small spring on the ball arrangement 65 between the sleeve and the central shaft.

Each of the interference members 71 is provided with a central hinge 73 which permits collapsing of the interference member to the extent that it is moved out of an interference position therefore the unloading device can be set up to unload all of the passing food baskets by extending each of the interference members to the interference position. However the device can also be set up to allow every second, third, fourth, etc. basket to clear beyond the unloading device for either unloading at a different position or for continued travel through the machine by simply collapsing the appropriate interference member out of the interference position.

When the unloading system is used with the loading system the two are set up such that the unloading arrangement is above the loading arrangement at the forward access of the machine. Both arrangements are easily controlled in that they are conveyor operated and will perform their separate functions according to the speed at which the conveyor is operated.

It will now be seen from the above that the present invention provides an industrial cooking machine capable of cooking large quantities of food in a short period of time. According to the type of food being run through the machine it can be used simply as a preheater, as a preheater and a cooker or strictly as a cooker. In addition the degree of cooking can be controlled by a number of different methods including adjusting the conveyor speed and/or independently controlling the operation of the individual burners.

The machine is provided with a number of different safety features which help to reduce the likelihood of either damage to the machine or excessive cooking of food carried through the unit. The provision of automatic loading and unloading devices also act as a safety precaution in that the operators' hands are generally maintained away from the machine out of the way of the conveyor.

From an energy saving standpoint the radiant heaters which are used in the cooking region are extremely efficient. In addition, each of these heaters is as well shown in FIG. 5, bordered by a heat deflector 30. Each of the heat deflectors is reflective to reflect the radiation from the heaters at the conveyor thereby maximizing the heating effect of the heaters.

Although various preferred embodiments of the invention have been described herein in detail it will be appreciated by those skilled in the art that variations may be made thereto without departing from the spirit of the invention or the scope of the appended claims.

The embodiments of the invention in which an exclusive property or privilege is claimed are defined as follows:

1. An industrial cooking machine comprising a housing, a preheat region, a cooking region in said housing, an endless conveyor for travelling on a path through both said preheat region and said heating region and a pair of accesses to said conveyor one at either end of said machine between said preheat region and said cooking region along the conveyor path, said conveyor being reversible in direction of travel whereby the arrangement is such that when said conveyor is moved in one direction food loaded thereon through either one of said accesses travels through said preheat in advance of said cooking region and when said conveyor is reversed the food travels directly to said cooking region with the other of the accesses being positioned in said cooking machine to enable unloading of the food prior to passing through the preheat region.

2. An industrial cooking machine as claimed in claim 1 wherein said cooking region is maintained at essentially constant temperature and wherein said conveyor is adjustable in speed of travel for varying degrees of cooking of the food loaded thereon at the constant temperature.

3. An industrial cooking machine as claimed in claim 2 wherein said cooking region is heated by means of a plurality of radiant heaters directed at said conveyor in said cooking region.

4. An industrial cooking machine as claimed in claim 1 including a drip pan beneath said cooking region for catching drippings from the food as it is being cooked.

5. An industrial cooking machine as claimed in claim 4 wherein said drip pan is provided with venting means for flushing of the drip pan.

6. An industrial cooking machine comprising a housing, a preheat region and a cooking region in said housing, an endless conveyor travelling on a path through both said preheat region and said cooking region and a first access and a second access to said conveyor separating said preheat region from said cooking region along the conveyor path and enabling loading and unloading of food onto said conveyor between said regions, said conveyor being reversible in direction of travel such that food loaded thereon at said first access is movable through said preheat region past said second access to said cooking region back to said first access and when said conveyor is reversed the food loaded on the conveyor at the first access is moveable directly through the cooking region to the second access which is positioned to permit unloading of the food without passing through the preheat region.

7. An industrial cooking machine as claimed in claim 6 wherein said first and second accesses to said conveyor are positioned at opposing ends of said cooking machine and wherein said cooking region generally surrounds said preheat region in said machine.

8. An industrial cooking machine as claimed in claim 7 wherein said conveyor is provided with a plurality of food baskets spaced apart on said conveyor and wherein said conveyor is arranged such that said food baskets align vertically with one another when in said cooking region such that food drippings from food loaded thereon drip from one basket to another in said cooking region for self basting of the food.

9. An industrial cooking machine as claimed in claim 8 wherein said food baskets are provided with hooks for securing said baskets to said conveyor and wherein said cooking machine is provided with automatic unloading means for tipping said baskets from said conveyor.

10. A cooking machine as claimed in claim 9 including take-away means for taking said baskets away from said machine after automatic unloading from the conveyor.

11. An industrial cooking machine as claimed in claim 9 wherein said automatic unloading means comprises a sleeve which is rotatable under pressure about a supporting shaft, said sleeve being provided with basket tipping members and conveyor engagement members exteriorly of and circumferentially off-set from said basket tipping members on said sleeve is set to support the weight of baskets coming into contact with said basket tipping members and to rotate about said shaft when the conveyor engages said conveyor engagement members.

12. An industrial cooking machine as claimed in claim 11 wherein said basket tipping members are movable away from a basket contacting position to permit travel of the basket therepast.

13. An industrial cooking machine as claimed in claim 9 including loading means for automatically loading the food baskets onto said conveyor, said loading means comprising a hook member in a hooking position for hooking said conveyor, a basket tray connected to said hook member which is drawn towards said conveyor as said hook member is hooked to the conveyor, said basket tray being adapted to carry one of the food baskets and position the food basket where the basket hooks are engaged by the conveyor, and a spring for returning said hook member to said hooking position.

14. An industrial cooking machine as claimed in claim 8 including control means provided with separate controls for each of said heaters such that said heaters are operable independently of one another.

15. An industrial cooking machine as claimed in claim 6 wherein said cooking region is provided with a plurality of radiant heaters directed at said conveyors, each of said heaters being bordered by a reflective deflector adapted to reflect radiation from each of said heaters at said conveyor for maximizing heat concentration at said conveyor.

16. An industrial cooking machine as claimed in claims 6 or 15 including a thermostatic control for turning off said burners in the event of excessive heat buildup in said cooking region.

* * * * *